(12) United States Patent
Schott et al.

(10) Patent No.: US 7,490,759 B2
(45) Date of Patent: Feb. 17, 2009

(54) ACCURACY OF DATA ENTRY INTO MICR LINE OF BANK CHECKS IN TRANSIT IN THE CLEARING PROCESS

(75) Inventors: Susan H. Schott, Waterloo (CA); Kevin S. Shamanski, Kitchener (CA)

(73) Assignee: NCR Corporation, Dayton, OH (US)

( * ) Notice: Subject to any disclaimer, the term of this patent is extended or adjusted under 35 U.S.C. 154(b) by 92 days.

(21) Appl. No.: 11/434,680

(22) Filed: May 16, 2006

(65) Prior Publication Data

US 2007/0267477 A1 Nov. 22, 2007

(51) Int. Cl.
*G07F 19/00* (2006.01)
(52) U.S. Cl. ..................................... 235/379
(58) Field of Classification Search ............... 235/379; 705/45, 75; 345/764
See application file for complete search history.

(56) References Cited

U.S. PATENT DOCUMENTS 6,384,844 B1 * 5/2002 Stewart et al. .............. 715/764
6,464,134 B1 * 10/2002 Page ........................... 235/379
2003/0074327 A1 * 4/2003 Meadow et al. ............... 705/75

OTHER PUBLICATIONS

RICOH|IBM website http://publib.boulder.ibm.com/infocenter/printer/v1r1/index.jsp?topic=/com.ibm.printers.ip4100opguide/ic3o0mst184.htm.*

* cited by examiner

*Primary Examiner*—Thien M Le
(74) *Attorney, Agent, or Firm*—Gregory A. Welte

(57) ABSTRACT

A process for correcting bank checks which are in transit to destination banks in a check clearing process. Specific patterns of errors in the MICR lines on the checks are sought and, if they are found, a technician is prompted to correct the MICR line. In addition, a display is generated which (1) is convenient for technicians to view for extended periods of time and (2) provides assistance to the technicians in making the corrections.

12 Claims, 5 Drawing Sheets

ACCURACY OF DATA ENTRY INTO MICR LINE OF BANK CHECKS IN TRANSIT IN THE CLEARING PROCESS

During the clearing process for bank checks, technicians assure that data written on the checks is properly encoded onto the so-called MICR line of each check. The invention assists the technicians in this process, particularly in a newly developed approach in the banking industry, wherein the bank checks are digitized, and paper checks are derived from the digitized checks when needed. The paper checks are often called Image Replacement Documents, IRDs.

BACKGROUND OF THE INVENTION

When a bank check is utilized in a transaction, the bank check is eventually deposited in a depositary bank. The deposited checks can be divided into two classes: (1) those drawn on the depositary bank and (2) those drawn on other banks.

The checks of the first class are retained by the depositary bank (which is a drawee bank as to those checks). This drawee bank debits each retained check against the proper customer's account, and then issues a monthly statement to each customer. The cancelled checks, or copies, may accompany the statements.

The checks of the second class are shipped to a central clearing agency, which distributes the checks to the proper drawee banks, which then process the checks as described above. These checks are sometimes called transit items.

This distribution process is highly automated. Early in the process, a set of numbers, called the MICR line (Magnetic Ink Character Recognition), is printed at the bottom of each check. The numbers indicate various items of data on the check, such as identity of the drawee bank, the monetary amount of the check, and so on. Automated equipment then uses the MICR line to route each check to its drawee bank.

Recently, a movement has begun to eliminate the transfer of paper checks as just described. Instead of paper checks, a digitized image, or bitmap, is captured of each check, including the MICR line. The digitized images are then transferred to the drawee banks instead of paper checks. However, since some banks do not possess the proper equipment to handle the digitized images, paper checks (called Image Replacement Documents, IRDs) are printed from the digitized images, and the paper checks, or IRDs, are transferred to these banks.

Some problems have been identified in this process. For example, sometimes the automated equipment mis-reads data on a check, and creates a MICR line which is incorrect or incomplete. Unless corrected, this faulty MICR line will carry over into the bitmap, and cause mistakes in later processing. As another example, sometimes the MICR line is initially printed correctly onto the paper check, but becomes defaced, so that automated equipment later cannot read the MICR line, either from the check or the bitmap.

Human technicians are employed to manually correct these errors. However, in order to efficiently employ the technicians, a strategy must be developed which allows the technicians to make maximum usage of their time. The invention provides such a strategy.

In addition, in the past, the level of care applied to the MICR lines differed, depending on whether the check was to be kept by the depositary bank, or returned to another bank. In the former case, (ie, involving checks of the first class discussed above) the bank was very interested that all information in the MICR line be correct. These banks employed human technicians to remove all errors in the MICR lines.

In the latter case (ie, involving checks of the second class discussed above), banking regulations did not require that the depositary bank guarantee complete accuracy of the MICR line. The depositary bank only concerned itself that the MICR line properly identified (1) the drawee bank and (2) the amount of the check. This procedure assured that the check reached the drawee bank, but did not assure that the entire MICR line was accurate. Any corrections required in the MICR line were left to the drawee bank which received the check, or possibly another party.

However, with the replacement of paper checks by digitized checks in the clearing process, these different levels of care for the MICR lines are no longer appropriate. The MICR line should be accurate for all checks. One simple reason is that the digitized image becomes a replacement for the cancelled paper check. To be a fully usable replacement, the digitized image must be accurate in all respects, including the MICR line.

OBJECTS OF THE INVENTION

An object of the invention is to improve the process wherein data is entered into the MICR line of a bank check, for so-called transit items, which are checks drawn on another bank.

SUMMARY OF THE INVENTION

In one form of the invention, machine reading is done of the MICR line in bank checks, to develop an interpretation of the MICR line. Several error conditions are defined in advance, and a corresponding corrective procedure is established for each error condition. A system examines the interpretation for the presence of one of the error conditions and, if found, prompts a technician to take the corresponding corrective procedure.

DETAILED DESCRIPTION OF THE INVENTION

Figure 1:
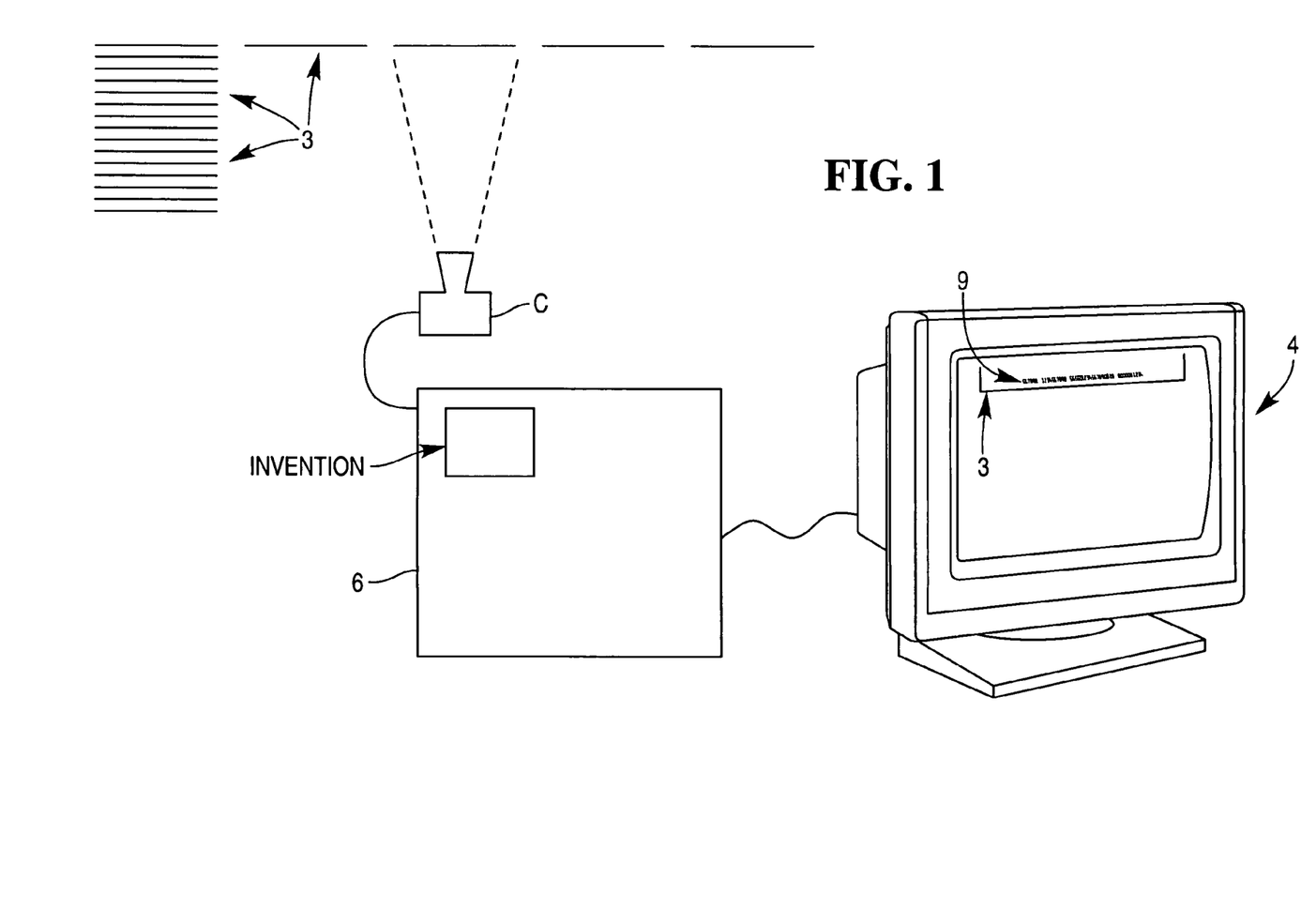
FIG. 1 illustrates a system utilizing one form of the invention.

FIG. 1 illustrates a stack of paper bank checks 3, which are fed by automated equipment (not shown) to a scanner, represented by camera C. The scanner C captures data printed on the bank check 3, and feeds the data to a system 6. The system 6 processes the data, as by performing character recognition, and characters recognized in a MICR line at the bottom of the check 3. The system 6 also takes an image of the check 3, and displays the printed MICR line 9 on display 4, also shown in FIG. 2.

As explained later, the MICR line 9 in FIG. 2 contain two errors, indicated by the error codes 37.

Figure 2:
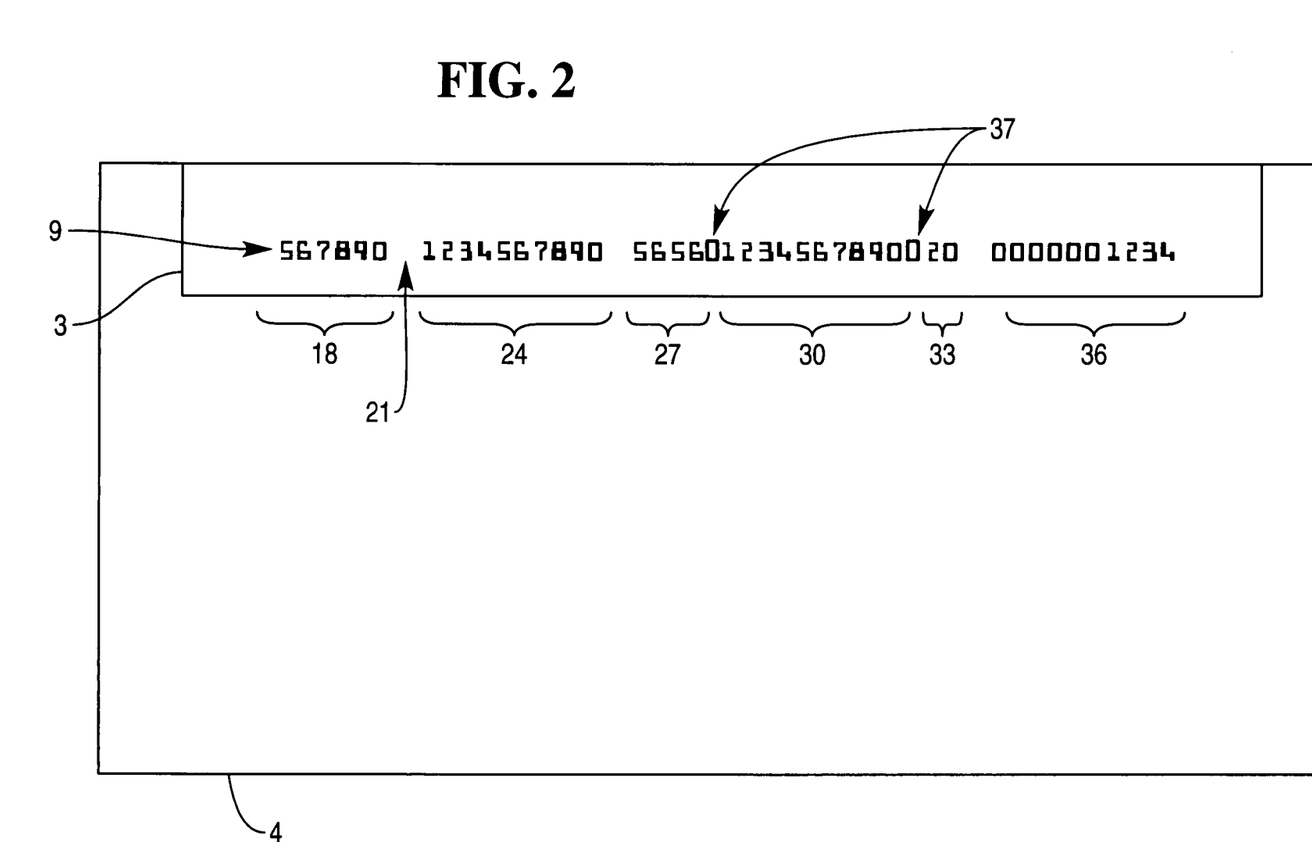
FIG. 2 illustrates a computer display generated by the system of FIG. 1, and a MICR line 9 on the display.

The MICR line 9 in FIG. 2 is divided into several fields, including (1) a field 18 for the serial number, also called the check number, (2) an exception processing code (EPC) field 21 (shown blank), used for purposes which need not be discussed herein, (3) a field 24 for the ID number of the bank on which the check 3 is drawn, (4) an optional field 27 for a special data about the check 3, which, again, need not be discussed, (5) a field 30 for the account number against which the check 3 is to be charged, (6) a field 33 which contains descriptive information about the check 3 (the "check" may actually be a deposit slip, and field 33 may indicate that fact), and (7) a field 36 stating the amount of the check 3.

In the MICR line 9, adjacent fields are separated from each other by special marks, or delimiters, which are not shown for simplicity. These are commonly called "Q-symbols," and they assist the character recognition system in isolating fields from each other.

Three particular fields, namely, fields 27, 30, and 33 make up the so-called ONUS fields. The ONUS fields have different significance to the bank processing the check, depending on whether the check is drawn on that bank or not. The term ONUS is a shorthand term for "the check is drawn ON US." If a check is drawn on the bank performing the processing described herein, the bank may, but not necessarily, process the check differently. Thus, the ONUS fields can prompt the bank toward the different processing, if desired.

Figure 3:
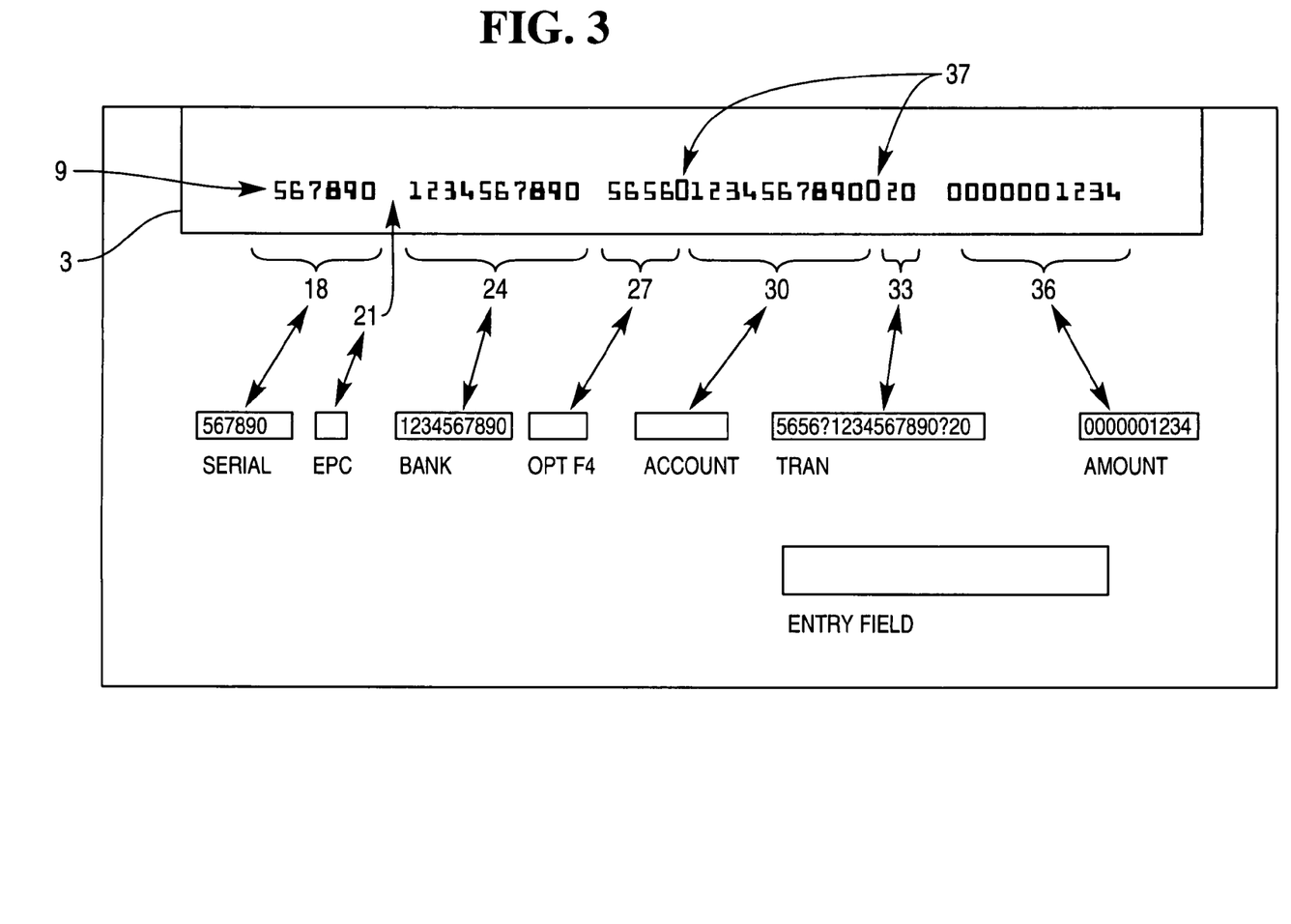
FIG. 3 illustrates a series of boxes created by the invention, each corresponding to a data field in the MICR line 9.

In FIG. 1, the system 6 also performs character recognition on the MICR line 9, to extract data from the MICR line 9. The system 6 displays the data extracted as individual fields, as indicated in FIG. 3.

This discussion will now explain several types of error which can occur in the interpretation of the MICR line 9, which can cause the displayed fields to present incorrect information.

Several different cases should be distinguished. In one case, Q-symbols and numbers are properly recognized, and no errors occur. This case presents no problems.

In the second case, a Q-symbol is neither recognized as such, nor incorrectly recognized as a number. The Q-symbol is not recognized as anything meaningful, and the system 6 issues an error symbol. FIG. 3 illustrates two such error symbols 37. This case will be designated Case 2A.

Case 2B can be analogously defined, wherein a number is neither correctly recognized, nor incorrectly recognized as another number. An error symbol 37 is also issued in this case.

In Case 3A, the Q-symbol is incorrectly recognized as a number. This can cause mistakes in later processing, but the invention is not concerned with resolution of those mistakes. Other, known, approaches handle the mistakes, although in certain situations, the invention can catch this type of error, as explained below.

Case 3B is analogous to Case 3A: a number can be incorrectly recognized as a different number, such as an "8" being recognized as "0". As in Case 2B, other approaches handle this type of mistake, if not caught by the invention.

In Cases 2A and 3A, the Q-symbol fails to act as a delimiter, and does not separate adjacent fields. Consequently, two, or more, fields become concatenated, as in the TRAN block in FIG. 3. The question marks in the TRAN block correspond to the error symbols 37, and indicate the presence of uncertain characters.

The concatenation occurred because Q-symbols are present at the locations of the two error symbols 37, but the Q-symbols were not recognized. Consequently, the character strings of fields 27, 30, and 33 become concatenated into a single string, which is printed in the TRAN block.

The invention focuses on the errors of Case 2A and 3A, wherein a symbol in the MICR line is not recognized, and that lack of recognition is explicitly declared, by issuance of the error symbol 37. The invention also focuses on the error of Case 3A, wherein a Q-symbol is incorrectly recognized as a number. How this focus is implemented will now be explained.

The fields of FIG. 3 are each assigned two allowable lengths. Table 1, below, provides one example of the lengths.

TABLE 1

| FieldName Number | Original Displayed Length | New Displayed Length |
|---|---|---|
| 1 Amount | 10 | 10 |
| 2 Tran | 6 | 19 |
| 3 Account | 14 | 18 |
| 4 Opt F4 | 5 | 16 |
| 5 Bank | 9 | 9 |
| 6 EPC | 1 | 1 |
| 7 Serial | 10 | 15 |

The column "Original Displayed Length" indicates currently used lengths, and is taken as the minimum length. The column "New Displayed Length" indicates a new, maximum, length.

One form of the invention implements one, or more, of the following rules.

RULE 1. If an ONUS field (ie, field 27, 30, or 33 in FIG. 3) is detected to contain more than the minimum field and up to the new maximum allowed number of characters of Table 1, all three ONUS fields are declared invalid, and a reject symbol (commonly a question mark) is placed into all three ONUS fields. All invalid fields will be prompted to be keyed.

"Keying" refers to the process wherein a technician operates a keyboard to insert text. Thus, when an invalid field is prompted to be keyed, a technician is requested to read data from the check, and type the data into the appropriate place in the MICR line.

The question mark requests the technician to visually interpret all three ONUS fields in the MICR line 9, or elsewhere on the check, and to enter the correct data into the ENTRY FIELD in FIG. 3. (The invention highlights a single block at a time, such as block 30 of the TRAN field. Any data entered into the ENTRY FIELD at that time is inserted into the highlighted block.)

It is pointed out that RULE 1 is expected to detect Cases 2A and 3A. Rule 1 is addressing the issue that for IRD printing, all fields on the item must be encoded on the new MICR line below the image on the screen. Rule 1 ensures that if fields are concatenated, all fields are ensured to be keyed.

For example, assume that under the requirements applicable to a specific check, the optional field F4 can be valid if it is either blank or contains data. Under this assumption, the following could happen in today's correction systems. In FIG. 3, assume that optional F4 (5650) and the account (1234567890) are concatenated into the account field (56501234567890) because the Q symbol in between them is not properly read.

Since the fields were concatenated into the account field, optional F4 is left blank. Under the applicable requirements, this is an acceptable possibility, and the validation process will accept the check. However, this is a problem because the optional F4 field actually contains data, which should have been keyed.

Under the invention, the forcing of rejects (that is, requesting fields to be keyed) because the account field was greater than the minimum field size (original), requires that both fields would be keyed. If the optional F4 field were meant to be blank, the operator would observe the blank field, and accept the field as blank.

RULE 2. If an error symbol occurs in any ONUS field, all ONUS fields are cleared, and the technician is requested to manually read the ONUS fields in the MICR line 8, or elsewhere, and insert correct data into the corresponding fields.

It is pointed out that Case 2A or 3A applies here. It is noted that RULEs 1 and 2 both detect Case 2A situations.

RULE 3. If 1) the total number of error symbols 37 in all fields (all fields including ONUS fields) exceeds a predetermined minimum or 2) the number of blank fields in all fields (all fields including ONUS fields) exceeds a maximum, then all fields in the display are cleared, and manual entry of all fields is requested. That is, a reject symbol (usually question mark) is placed in every box in FIG. 3, and the technician enters data into the ENTRY FIELD for each box.

It is pointed out that this RULE 3 can apply if a check is positioned in an incorrect orientation when scanned, such as being upside down or backward.

Some variations on these Rules are discussed below, in the section entitled "Additional Considerations."

Therefore, the RULEs just discussed are implemented, in order to correct errors of the type described above. The Inventors point out that these RULEs do not correct all possible types of error, and that certain errors slip through. Many of the latter are corrected by other, known, procedures later in the clearing process.

This discussion will now consider approaches to arranging items in the display of FIG. 3 in a manner which improves effectiveness of the technicians in the correction processes described herein.

Table 1, above, indicates that each field is assigned a maximum number of characters. However, many computer monitors in common usage can only display a limited number of characters in a single row.

With such a monitor, if each field is to contain the maximum number of characters, then all fields cannot be present in a single row. That is, if each field is displayed with its maximum number of characters, then the row of fields will extend past the edge of the display.

Figure 4:
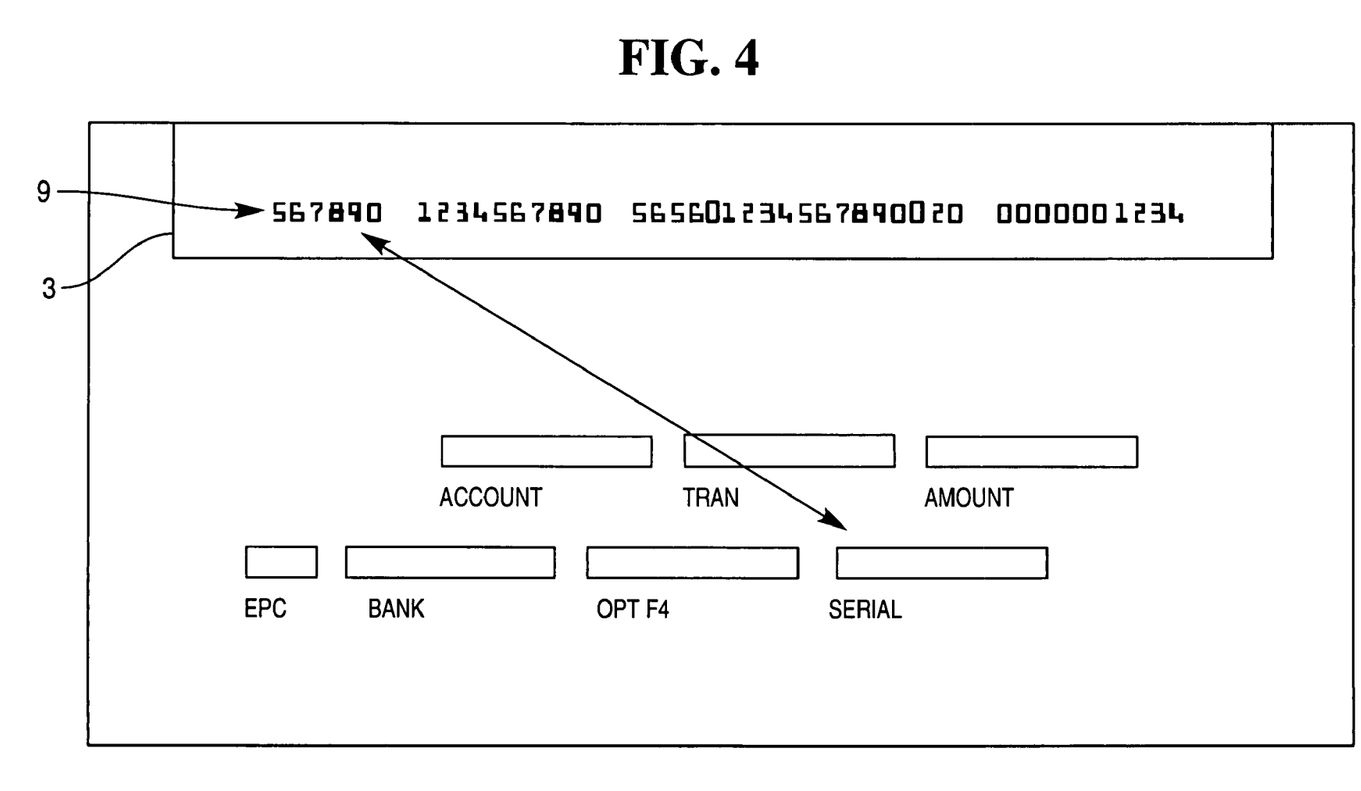
FIG. 4 illustrates the boxes of FIG. 4, but all at their maximum length, which requires two rows to display the boxes.

One response to this problem is to "wrap" the row, as shown in FIG. 4, thereby creating two, or more, rows. However, this wrapping makes it difficult for the technician to correlate a given field with its corresponding data in the MICR line 9. For example, the SERIAL box and the serial field are indicated by the double arrow. The mental effort required of the technicians to continually pair these two items together is considered excessive.

One solution is to vary the lengths of the fields, so that each field is only sufficiently long to contain its data. However, this solution creates its own problem. Since the fields are of continually varying length, they will hop about on the screen.

Figure 5:
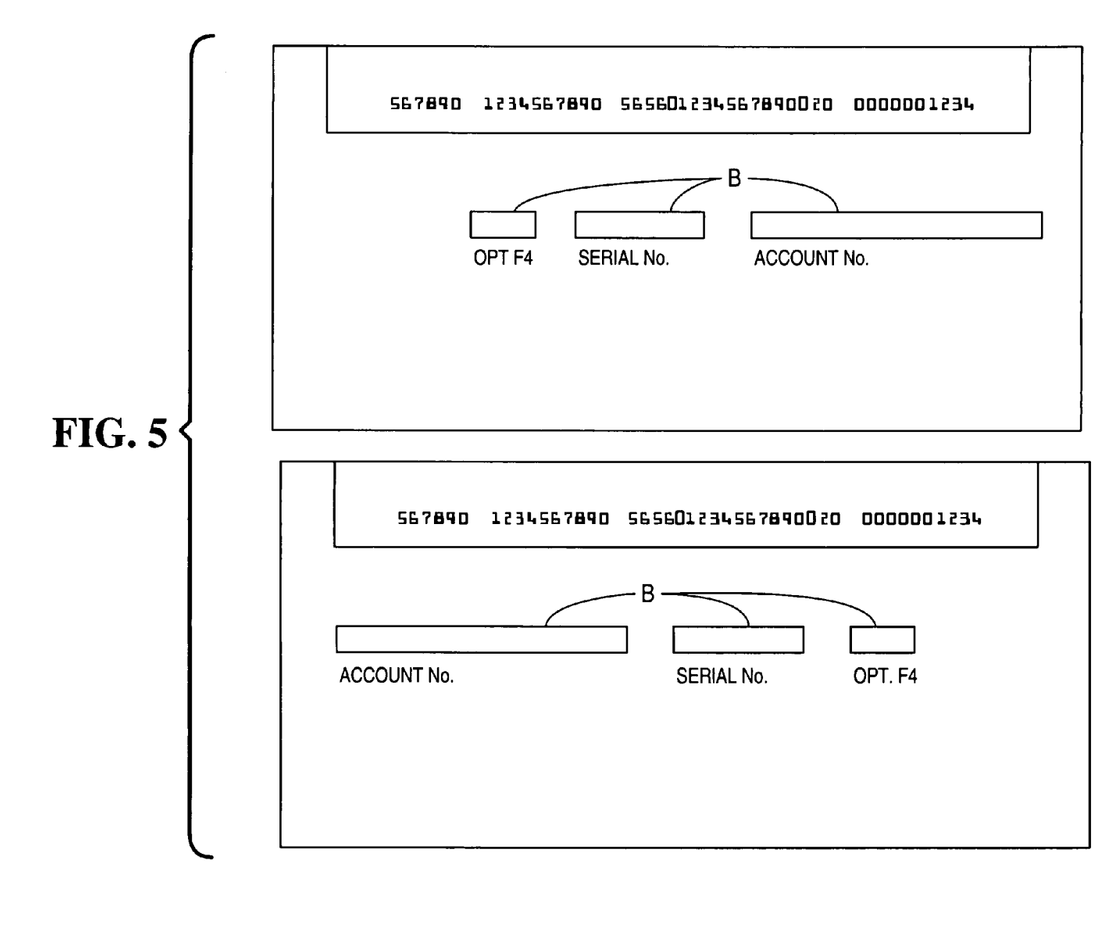
FIG. 5 illustrates a problem which can arise if the boxes are adjusted in size for each check.

FIG. 5 provides a simplified example. The display will repeatedly change from that shown at the top of the Figure to that shown at the bottom. The technician must continually dart the eyes about on the screen, to locate the same field in different checks. This is considered fatiguing to the technicians, who typically process checks at a rate of 900 checks per hour.

In one form of the invention, the display of the fields is undertaken as follows. Two fields, such as the two fields in FIG. 3 which bracket the ONUS fields, are displayed at fixed locations. These two fields could be the bank field 24 and the amount field 33 in FIG. 3.

Initially, all field boxes (ONUS fields and other fields) are displayed at default lengths, such as the minimum lengths indicated in Table 1. In one form of the invention, one, or more, of the following rules are implemented, as the boxes are populated with data.

RULE A. A field box may be required to display more characters than the default minimum stated in Table 1. This can occur if two fields become concatenated, due to misrecognition of a Q-symbol, as discussed above. In this case, the field is then displayed at the maximum size stated in Table 1. The field is expanded to maximum length.

This RULE A applies specifically to ONUS fields exclusively. In another approach, RULE A can apply to other fields as well.

In one approach, when RULE A is implemented in an ONUS field, the adjacent ONUS field (if any) is displayed at the stated minimum default length. This adjacent ONUS field may be the one located to the right of the expanded field (as opposed to the left), because of the direction in which reading of the MICR line occurs. That is, assume that (1) the MICR line is read left-to-right by the equipment, and (2) the field boxes are populated left-to-right in FIG. 3 with data read from the MICR line. In a sense, this assumes a first-in, first-out process. Data at the left of the MICR line is the first-in. This data is the first-out, and is delivered to the boxes at the left.

If, for example, the ACCOUNT and TRAN fields become concatenated, the system assumes that the concatenated set of fields belongs to the ACCOUNT box, because that will be filled before boxes to its right. Thus, that box is expanded, and the adjacent box to the right is kept at minimum size.

Of course, the direction of reading the MICR line, and the order of filling the boxes, is up to the designer. But the decision to expand one box, and keep another at minimum size, is based on the principle that data is allocated to boxes in a specific direction (left-to-right in this example). If concatenation occurs, the concatenated data is delivered to the first box in line, and it is assumed that the concatenation usurps data otherwise bound for one, or more, boxes next in line. Thus, those next boxes are displayed at the minimal length of Table 1.

RULE B. When technician intervention is requested for a field, the field is highlighted. A separate "entry" box is created and displayed, as in FIG. 3, and is used as an entry point.

The highlighted field is of a length corresponding to the length of the data expected, as a prompt to the operator. For example, a long highlighted field prompts the operator to look for a long section in the MICR line 9, as opposed to a short section.

The expected length can be the minimum length in Table 1.

If the data entered by the operator will not fit into the highlighted blank as it is being entered, then the blank is extended to the maximum length of Table 1.

Additional Considerations

1. As stated above, it is preferable that the displayed fields occupy a single row, so that each field can be visually correlated with its corresponding section of the MICR line 9. The double arrows of FIG. 3 indicate the correlation. However, it may sometimes be required that the wrapping shown in FIG. 4 be undertaken, because the fields collectively are simply too long to occupy a single line.

2. The parameters, or conditions, which induce (1) clearing of displayed fields and (2) requesting of intervention by a technician may be adaptive. That is, the parameters or conditions may change for each check. An example will illustrate.

A given bank may have a large number of customers, so that the account-number field labeled 30 in FIG. 3 may be quite long. That long field may exceed the maximum shown in Table 1.

Thus, one form of the invention would first identify the bank on which each check is drawn, based on the bank-field 24. Then, the invention would inquire whether any conditions for error-detection, and thus technician intervention, should be altered. In the present example, the maximum for the account-field in Table 1 should be increased.

As another example, the RULEs described above can be modified, depending on the preferences of the bank on which a check is drawn. For instance, some banks may allow certain fields to be blank. Thus, an operator should not be requested to handle those fields on a check for such a bank.

As another instance, certain data may not be required in the MICR line, if a drawee bank is processing its own check. For example, the drawee bank may keep the paper check, so it may not wish to have its technicians spend time entering extra data onto the MICR line, since the bank may later process the check as an ordinary paper check, without regard to that data in the MICR line.

As a third instance, some banks may not require correction of errors in certain fields. Thus, again, the identity of the bank of a check is identified, and the fields which it wants corrected are ascertained. Only those fields are corrected, if errors are found.

Thus, the RULEs implemented may be adaptive, and different rules may be applied to checks of different banks.

3. Some of the rules discussed above can be stated in different terms.

First, a definition can be established. The issuance of an error symbol 37 in FIG. 3 can be called a declared non-recognition. That is, non-recognition occurs, and the fact of non-recognition is detected and declared (as opposed to the case where an "8" is recognized as "0," which is not detected, and thus cannot be declared).

If (1) a declared non-recognition occurs in any ONUS field (or a specific subset of the fields), or (2) the number of characters in any ONUS field exceeds a predetermined maximum, then all ONUS fields are cleared, and technician intervention is requested for all of them.

If an error is detected in any field in a specific group of fields, all displayed fields in the group are cleared, and entry of data into all fields is requested.

4. The processes of reading data from the check, determining certain errors in the data, and inserting the data into the MICR line is known in the art. The invention is primarily concerned with making decisions as to when to prompt a technician to manually enter data for a field, when these processes fail.

5. The data contained in the boxes in FIG. 3, such as the data 567890 in the SERIAL box, can be viewed as an interpretation of a part, or field, of the MICR line. That is, character recognition apparatus (not specifically shown) derives, or interprets, the data, based on the MICR line.

In one form of the invention, the interpreted data is displayed adjacent to the field of the MICR line from which it was derived. One definition of adjacent is that no other interpreted data is closer to the field in question. For example, the BANK data 1234567890 in FIG. 3 is not closer to the field 18 in the MICR line.

Numerous substitutions and modifications can be undertaken without departing from the true spirit and scope of the invention. What is desired to be secured by Letters Patent is the invention as defined in the following claims.

What is claimed is:

1. For a bank check which is in-transit to a destination bank during a check-clearing process, and contains a MICR line which includes
   (1) a serial number,
   (2) an account number, and
   (3) an optional field (F4), a method comprising:
   a) delivering the check to automated equipment;
   b) using the automated equipment to
      i) ascertain whether length of the serial number exceeds a limit A, and if so,
      ii) prompt an operator to manually key at least both the serial number and the account number into the MICR line.

2. Method according to claim 1, and further comprising:
   c) using the automated equipment to
      i) ascertain whether length of the account number exceeds a limit B; and if so
      ii) prompt an operator to manually key at least both the serial number and the account number into the MICR line.

3. Method according to claim 2, and further comprising:
   d) using the automated equipment to ascertain whether length of the optional field (F4) exceeds a limit C; and
   e) if so, prompting an operator to manually key the serial number, the account number, and the optional field (F4) into the MICR line.

4. Method according to claim 1, wherein the MICR line contains a sequence of fields, and further comprising:
   c) displaying an image of the MICR line on a screen; and
   d) displaying an interpretation of each field adjacent the field itself.

5. Method according to claim 4, wherein the MICR line contains ONUS data, which includes (1) serial number, (2) account number, and possibly (3) an optional field (F4), and wherein the interpretations include ONUS-interpretations of ONUS data, and further comprising:
   e) deleting ONUS-interpretations;
   f) making an estimate of length of a correction to ONUS data to be made by the technician; and
   g) replacing the deleted ONUS-interpretations with a blank together with an indication of said estimated length.

6. Method according to claim 5, wherein the indication assists an operator in visually locating ONUS data which is to be read by the operator, and keyed into the blank.

7. For a bank check which is in-transit to a destination bank during a check-clearing process, and contains a MICR line which includes (1) a serial number, (2) an account number, and (3) an optional field (F4), a method comprising:
   a) delivering the check to automated equipment;
   b) using the automated equipment to
      i) ascertain whether an error exists in the serial number; and if so
      ii) prompting an operator to manually key at least both the serial number and the account number into the MICR line.

8. Method according to claim 7, and further comprising:
   C) using the automated equipment to
      i) ascertain whether an error exists in the account number; and if so
      ii) prompt an operator to manually key at least both the serial number and the account number into the MICR line.

9. Method according to claim 8, and further comprising:
   c) using the automated equipment to ascertain whether an error occurs in the optional field (F4), and, if so, prompting an operator to manually key the serial number, the account number, and the optional field (F4) into the MICR line.

10. A method of correcting a MICR line on a bank check which is in-transit to a destination bank during a check clearing process, comprising:
  a) delivering the check to automated equipment;
  b) using the automated equipment to
    i) read data from the check and enter the data into a MICR line, together with error symbols when data cannot be read;
    ii) ascertain whether total number of error symbols in the MICR line exceeds a limit C and, if so, issuing a prompt to an operator to manually enter the entire MICR line.

11. Method according to claim 10, and further comprising:
  c) ascertaining whether number of blank fields in the MICR line exceeds a limit and, if so, issuing a prompt to an operator to manually enter the entire MICR line.

12. Method according to claim 10, wherein each error symbol corresponds to a digit in the MICR line.

* * * * *